US005505757A

United States Patent [19]

Ishii

[11] Patent Number: 5,505,757

[45] Date of Patent: Apr. 9, 1996

[54] CORROSION-RESISTANT METAL FILTERS

[75] Inventor: Masayuki Ishii, Itami, Japan

[73] Assignee: Sumitomo Electric Industries, Ltd., Osaka, Japan

[21] Appl. No.: 292,774

[22] Filed: Aug. 18, 1994

[30] Foreign Application Priority Data

Aug. 20, 1993 [JP] Japan .................................... 5-206255

[51] Int. Cl.[6] ................................................ B01D 39/20

[52] U.S. Cl. ................................ 55/523; 55/525; 55/527; 55/DIG. 30; 60/311; 210/509; 210/510.1

[58] Field of Search .............................. 55/525, 523, 527, 55/DIG. 30; 210/510.1, 509; 60/311

[56] References Cited

U.S. PATENT DOCUMENTS

| | | | |
|---|---|---|---|
| 1,147,279 | 7/1915 | Sweetland | 55/525 |
| 2,554,343 | 5/1951 | Pall | 55/523 |
| 2,826,805 | 3/1958 | Probst et al. | 210/510.1 |
| 2,928,733 | 3/1960 | Wagner | 210/510.1 |
| 3,049,796 | 8/1962 | Pall | 210/510.1 |
| 3,087,233 | 4/1963 | Turnbull | 55/523 |
| 3,581,902 | 6/1971 | Bidler | 210/510.1 |
| 3,690,606 | 9/1972 | Pall | 210/510.1 |
| 3,705,021 | 12/1972 | Sundberg et al. | 29/182.3 |
| 4,270,936 | 6/1981 | Mann | 55/520 |
| 4,287,068 | 9/1981 | Bewley | 210/510.1 |
| 4,360,433 | 11/1982 | Walker et al. | 210/510.1 |
| 5,130,100 | 7/1992 | Serizawa | 55/525 |
| 5,204,068 | 4/1993 | O'Loughlin et al. | 55/525 |

FOREIGN PATENT DOCUMENTS

| | | |
|---|---|---|
| 0561001 | 9/1993 | European Pat. Off. . |
| 17-13077 | 7/1942 | Japan . |
| 54-42703 | 12/1979 | Japan . |
| 4124419 | 4/1992 | Japan . |
| WO/92/17691 | 10/1992 | WIPO . |

*Primary Examiner*—Jay H. Woo
*Assistant Examiner*—Duane S. Smith
*Attorney, Agent, or Firm*—Wenderoth, Lind & Ponack

[57] ABSTRACT

Metal filter for a particulate trap which meets the requirements for low pressure drop, high collecting capacity and a long life. The metal filters have one or more layers of unwoven fabric (such as felt) formed of a metal fiber having one of the following alloy compositions A, B and C wherein composition A is made of Ni: 5–20% by weight, Cr: 10–40 by weight, Al: 1–15% by weight, the remainder being Fe and inevitable impurities; composition B is made of Cr: 10–40% by weight, Al: 1–15% by weight, the remainder being Ni and inevitable impurities; and composition C is made of Cr: 10–40% by weight, Al: 1–15% by weight, the remainder being Fe and inevitable components. The metal filter is highly resistant to corrosion and heat and can withstand repeated heatings for removal of the particulate.

7 Claims, No Drawings

CORROSION-RESISTANT METAL FILTERS

BACKGROUND OF THE INVENTION

This invention relates to a filter for collecting particulates contained in exhaust, and more specifically a filter having increased corrosion resistance and high durability.

Exhausts produced by automobiles are one of the major causers of atmospheric pollution and thus it is very important to develop a technique for removing harmful components from car exhausts.

In case of diesel engine exhausts, it is of utmost importance to remove particulates contained in exhausts, which are mainly NOx and carbon.

In order to remove such harmful contents, various efforts have been made to improve the engine structure. Such efforts include attaching an EGR and improving the fuel injection mechanism. But none of them has been a decisive solution. Another way to remove particulates is to provide a particulate trap in the exhaust passage (Unexamined Japanese Patent Publication 58-51235). This method, which is called the "post-treatment method", is considered the most practical and thus is now under extensive study.

A particulate trap used to collect particulates contained in diesel engine exhausts has to satisfy the following three requirements:

(1) Exhausts collecting capacity

First, such a trap has to be capable of collecting particulates in exhausts to such an extent that the exhausts are purified to a satisfactory level. For this purpose, it is considered necessary to collect at least 60% of the particulates contained in diesel engine exhausts, though it depends on the displacement of the dièsel engine and the load on the engine.

(2) Pressure drop

Second, such a trap must not unduly increase the pressure drop of the exhaust. As the particulates collected by the trap increases, the pressure drop when the engine exhausts pass through the trap tends to increase. If the pressure drop exceeds a certain level, a back pressure may act on the engine, which gives a harmful influence on the engine. In order to protect the engine from the harmful influence of the back pressure, it is considered necessary to keep the pressure drop below 30 KPa. For this purpose, the particulates collected by the trap have to be periodically removed to reduce the pressure drop to the original level. If the increase rate of the pressure drop relative to the amount of particulates collected is too high, the particulates have to be removed too frequently to be practical. Thus, it is necessary that such a particulate trap have a low initial pressure drop and that the pressure drop be less likely to increase with an increase in the amount of particulates trapped.

(3) Durability of the material

Third, such a trap has to be made of a material which is durable enough to be capable of withstanding repeated particulates removing treatments for regeneration of the trap. It is considered that the best way to regenerate the trap is to burn off the particulates with an electric heater or a burner. To burn off particulates, the trap has to be heated to a temperature higher than the ignition temperature of the particulates (about 600° C.). Such regeneration treatment has to be done before the back pressure increases to such a level as to lower the engine performance or impair the maneuverability of the vehicle. Each time when a predetermined amount of particulates recollect, the regeneration treatment is repeated. The pressure drop is thus kept under a predetermined level. Thus, the trap has to be made of a material which is so heat-resistant that it can withstand repeated regeneration treatments and which is also so corrosion-resistant that it can withstand corrosive gas contained in exhausts.

Heretofore, a wall-flow type, honeycomb-shaped, porous matter of cordierite ceramic has been considered most desirable as a filter element material that satisfies the above three requirements. But this material has a problem in that particulates tend to concentrate locally. Also, since a cordierite ceramics is low in thermal conductivity, heat spots are likely to develop when regenerating. Thus, there is a possibility that the filter may melt or may crack due to thermal stress. Such a filter is not reliable enough.

To solve this problem, a honeycomb-shaped porous filter made of an SiC ceramic was proposed (Unexamined Japanese Patent Publication 5-23512). Since SiC is high in thermal conductivity, such a filter is less likely to melt or develop heat spots during regeneration. But this material is actually not used for a particulate trap because it requires a prohibitively large calorie for regeneration.

The present applicant proposed a diesel particulate trap which is made of a foamed stainless steel or a composite of such a foamed steel and a metallic unwoven fabric (such as felt) and which can be regenerated without the fear of melting or cracking (Unexamined Japanese Patent Publication 4-86313). But since the stainless steel used is low in resistance to corrosive gas, the life of the trap is unsatisfactory. In particular, an unwoven fabric made of an Fe/Cr/Ni alloy or an Ni/Cr alloy and having a fiber diameter of less than 50 μm tends to suffer a large change in its weight when oxidized in a high-temperature atmosphere of 600° C. or more, though it has a high particulate-collecting capacity. Due to its insufficient corrosion resistance when exposed to diesel engine exhausts, its fibers tend to erode quickly. This leads to deterioration in the particulate-collecting capacity and deformation of the filter. The life of such a trap is thus too short for practical use.

An object of the present invention is to provide a particulate trap which is practical in every sense, and more particularly to provide a metal filter for use in a particulate trap that satisfies all the above-mentioned requirements, that is, high particulate-trapping capacity, low pressure drop, and high durability of the material.

SUMMARY OF THE INVENTION

According to the present invention, there is provided a metal filter for use in a particulate trap, said metal filter comprising a single or a plurality of layers of unwoven fabric formed of metal fiber having one of the following compositions A, B and C, wherein A . . . Ni: 5–20% by weight, Cr: 10–40% by weight, Al: 1–15% by weight, the remainder being Fe and inevitable components;

B . . . Cr: 10–40% by weight, Al: 1–15% by weight, the remainder being Ni and inevitable components; and C . . . Cr: 10–40% by weight, Al: 1–15% by weight, the remainder being Fe and inevitable components.

In another arrangement, the metal filter may be formed of a heat-resistant foamed metal having numerous pores that communicate with one another, the pores being filled with metal fibers having a diameter of from 5 to 40 μm, the packing ratio in the pores being 5–25%.

The unwoven fabric used in the former filter is preferably formed by bundling metal fibers having an average diameter of from 5 to 40 μm into a single aggregate so that its packing ratio will be 5–25%. The thus aggregated fibers are fixed together with a suitable method, e.g. with an adhesive or by mechanically entangling them together.

The metal fibers used in the present invention may be hollow ones or fibers having a core made of a different material from the surrounding material.

An alloy material comprising an Fe/Cr alloy, an Fe/Ni alloy or an Ni/Cr alloy with Al added thereto forms a stable oxide by the interaction between Al and Cr. Because the oxide thus formed serves as a stable layer, the alloy material is less liable to change in weight due to oxidation or diesel engine exhausts even in a high-temperature oxidizing atmosphere or a high-temperature sulfidizing atmosphere. The life of the filter thus extends markedly.

The metal fibers used should preferably have an average diameter of 5–40 μm and a packing ratio of 5–25%. If only the particulate-collecting efficiency is considered, the fiber diameter should be as small as possible and the packing ratio should be as high as possible. But for higher durability, too small a fiber diameter is a disadvantage. Also, the higher the packing ratio, the higher the pressure drop tends to be. Taking all these factors into consideration, we found that it is possible to improve the particulate-collecting efficiency, reduce the pressure drop and to improve the durability in a balanced manner by setting the fiber diameter and the packing ratio within the above-mentioned ranges.

Use of hollow fibers as the metal fibers makes it possible to increase the particulate-collecting surface of the filter. If fibers having cores made of a different material from the surrounding material are used, it is possible to compensate for any decrease in toughness due to the addition of Al by selecting a suitable material for the fiber core.

Now we will explain the reasons why the contents of the components of the three kinds of metal fibers are limited to the above-mentioned ranges.

Cr is a basic element needed to attain sufficient heat resistance and oxidation resistance. According to the present invention, oxidation resistance is provided mainly by the provision of an alumina film. If the Cr content is low, the adhesion and protective properties of alumina film will decrease, making it difficult to maintain the oxidation resistance. On the other hand, if the Cr content is excessive, the toughness tends to decrease. The metal fiber containing 10–40% by weight of Cr is free of either of these problems.

Al is added to improve the oxidation resistance. But this element is also needed to maintain high heat resistance.

If the Al content is less than 1% by weight, oxidation resistance will improve little. The addition of more than 15% by weight of Al will worsen workability.

By subjecting the base metal to the calorizing treatment, in which Al is diffused into the base metal, it is possible to change the composition so that the Al content is higher near the surface of the fiber. The fiber thus formed shows higher oxidation resistance and heat resistance. But even in this case, the weight ratio of Al to the entire alloy should be limited within the range from 1% to 15%. Addition of more than 15% by weight of Al would lower the toughness of the alloy so markedly that the alloy is more likely to be cracked due to impacts and vibrations. But this limitation is not applicable to a fiber having a core made of a high-toughness metal.

It is possible to diffuse Al to a desired depth from the surface of the metal fiber by controlling the temperature and time of the calorizing treatment. For example, it is possible to adjust the distribution of Al in the alloy so that its concentration is high near the surface for higher oxidation resistance and is low inside for higher heat resistance.

If hollow fibers are used, such fibers can be formed by providing a metal plating layer around a fiber core which can be removed by burning, and removing the core by burning.

By using an unwoven fabric made of metal fiber, the metal filter according to the present invention can attain both low pressure drop and high particulate-trapping efficiency. Since the metal fiber is formed by adding Al to Fe/Cr alloy, Fe/Cr/Ni alloy or Ni/Cr alloy, the filter according to this invention shows high durability. This will quicken practical application of particulate traps for diesel engines, which has long been desired as one of the effective measures against the environmental pollution but has been delayed due to poor durability.

DETAILED DESCRIPTION OF THE PREFERRED EMBODIMENT

EXAMPLE

We prepared particulate traps and subjected them to an endurance test in which they were exposed to exhausts.

In the endurance test, exhausts produced by a 3400-cc, 4-cylinder, direct-injection diesel engine car when driving it at 2400 rpm under the 4/4 load condition and kept at a temperature of 600°–650° C. were fed through each particulate trap to purify the exhausts. We also conducted a cycle endurance test in which the same engine as above was alternately driven and stopped at the intervals of one hour, with the particulate traps attached thereto.

The particulate traps used in the tests each comprised a cylindrical trap housing, and seven cylindrical filter elements made of unwoven metal fabric and mounted in the trap housing. Exhaust was introduced into the space defined between the outer surface of the filter elements and the inner surface of the trap housing from one end of the space. The other end of this space was closed by a gasket and an iron plate. Thus, the exhausts introduced into the trap flow through the filter elements from their outside through the filter wall to inside and discharged from the trap.

Table 1 shows the details of the filter element specimens tested and the test results. The specimens in group A are comparative specimens and contain no Al. Each of the specimens in group A is formed by cylindrically rolling an unwoven metal fabric formed by aggregating and compressing metal fibers formed by bundling and drawing, and an unwoven fabric formed by metallizing by plating an unwoven fabric of an organic fiber or carbon fiber.

The other specimens are those according to the present invention. Those in group B are formed by adding Al to an unwoven metal fabric that contains no Al by vapor phase diffusion to obtain a desired composition.

The specimens in group C are each formed of an unwoven metal fabric formed by aggregating and compressing metal fibers obtained by bundling and drawing a molten material containing Al. The specimens in group D are made of a foamed metal having pores communicating with one another and filled with metal fibers fixed thereto. Al was added to the foamed metal by vapor phase diffusion to obtain a desired composition.

The test results are also shown in Table 1.

In the Examples, only Al was added by vapor phase diffusion to the base of an Fe/Cr alloy, an Fe/Cr/Ni alloy, or an Ni/Cr alloy. But the same results were attained when Fe, Cr or Al was added to Ni by vapor phase diffusion until a desired composition is obtained, or when Cr and Al were added to any one of Fe/Ni alloy, Ni and Fe until a desired composition is obtained.

TABLE 1

| | Size: 48 D × 39 D × 190 L (mm) seven filter elements | Material (% by weight) | | | | Endurance test results | |
|---|---|---|---|---|---|---|---|
| Specimens | Unwoven metal fabric material | Fe | Cr | Ni | Al | Time | Cycle |
| A-1 | 0.5 mt, *p.r. 10%, *diam. 20 μm | *bal | 17 | 14 | — | 50 h | 25 c |
| -2 | 0.5 mt, p.r. 25%, diam. 40 μm | bal | 17 | 14 | — | 75 h | 50 c |
| -3 | 0.5 mt, p.r. 10%, diam. 20 μm | — | 25 | bal | — | 250 h | 200 c |
| -4 | 0.5 mt, p.r. 25%, diam. 40 μm | — | 25 | bal | — | 350 h | 250 c |
| -5 | 0.5 mt, p.r. 10%, diam. 20 μm | bal | 20 | — | — | 100 h | 100 c |
| -6 | 0.5 mt, p.r. 25%, diam. 40 μm | bal | 20 | — | — | 150 h | 150 c |
| B-1 | 0.5 mt, p.r. 10%, diam. 20 μm | bal | 16 | 13 | 6 | 1500 h | 1500 c |
| -2 | 0.5 mt, p.r. 25%, diam. 40 μm | bal | 16 | 13 | 6 | 2000 h | 2000 c |
| -3 | 0.5 mt, p.r. 10%, diam. 20 μm | bal | 17 | 14 | 1 | 800 h | 800 c |
| -4 | 0.5 mt, p.r. 25%, diam. 40 μm | bal | 15 | 12 | 15 | 2000 h | 1500 c |
| -5 | 0.5 mt, p.r. 10%, diam. 20 μm | bal | 40 | 14 | 6 | 2000 h | 1200 c |
| -6 | 0.5 mt, p.r. 25%, diam. 40 μm | bal | 10 | 14 | 6 | 2000 h | 2000 c |
| -7 | 0.5 mt, p.r. 10%, diam. 20 μm | bal | 17 | 5 | 6 | 1500 h | 1500 c |
| -8 | 0.5 mt, p.r. 25%, diam. 40 μm | bal | 17 | 20 | 6 | 1800 h | 1800 c |
| -9 | 0.5 mt, p.r. 10%, diam. 20 μm | — | 23 | bal | 6 | 2500 h | 2500 c |
| -10 | 0.5 mt, p.r. 25%, diam. 40 μm | — | 40 | bal | 6 | 2500 h | 1800 c |
| -11 | 0.5 mt, p.r. 10%, diam. 20 μm | — | 10 | bal | 6 | 1800 h | 1800 c |
| -12 | 0.5 mt, p.r. 25%, diam. 40 μm | — | 25 | bal | 1 | 1500 h | 1500 c |
| -13 | 0.5 mt, p.r. 10%, diam. 20 μm | — | 22 | bal | 15 | 2500 h | 1300 c |
| -14 | 0.5 mt, p.r. 25%, diam. 40 μm | bal | 25 | — | 6 | 2500 h | 1300 c |
| -15 | 0.5 mt, p.r. 10%, diam. 20 μm | bal | 10 | — | 6 | 2000 h | 2000 c |
| -16 | 0.5 mt, p.r. 10%, diam. 20 μm | bal | 35 | — | 6 | 2500 h | 2500 c |
| C-1 | 0.5 mt, p.r. 10%, diam. 20 μm | bal | 16 | 13 | 6 | 1500 h | 1500 c |
| -2 | 0.5 mt, p.r. 10%, diam. 20 μm | — | 25 | bal | 6 | 2500 h | 2500 c |
| -3 | 0.5 mt, p.r. 10%, diam. 20 μm | bal | 20 | — | 6 | 2500 h | 2500 c |
| D-1 | Fiber with 40 μm dia. | — | 23 | bal | 6 | 3000 h | 3000 c |
| -2 | sintered with ※Cermet (1.8 mt, p.r. 10%) to p.r. of 5% | — | 25 | bal | 1 | 1500 h | 1500 c |
| -3 | Fiber with 18 μm dia. | — | 23 | bal | 6 | 2500 h | 2500 c |
| -4 | sintered with Cermet (1.8 mt, p.r. 10%) to p.r. of 20% | — | 40 | bal | 6 | 2500 h | 1800 c |

*p.r. - Packing ratio
*diam. - fiber diameter
*bal. - balance
※ Cermet (trademark): Ni-based three-dimensional mesh-like porous member made by Sumitomo Electric Ind., Ltd.

What is claimed is:

1. A corrosion-resistant metal filter comprising a member selected from the group consisting of a single layer and a plurality of layers of nonwoven fabric formed of metal fiber selected from the group consisting of alloy compositions A, B and C, wherein composition A comprises Ni: 5–20% by weight, Cr: 10–40% by weight, Al: 1–15% by weight, based on the total weight of the composition, the remainder being Fe and inevitable impurities;

composition B comprises Cr: 10–40% by weight, Al: 1–15% by weight, based on the total weight of the composition, the remainder being Ni and inevitable impurities; and composition C comprises Cr: 10–40% by weight, Al: 1–15% by weight, based on the total weight of the compositions, the remainder being Fe and inevitable impurities.

2. A corrosion-resistant metal filter as claimed in claim 1 wherein said nonwoven fabric is formed by aggregating metal fibers having an average diameter from 5 to 40 μm so that a packing percentage will be 5–25%.

3. A corrosion-resistant metal filter as claimed in claim 1 or 2 wherein said metal fiber is a member selected from the group consisting of a hollow fiber and a fiber having a core made of a material different from a surrounding material.

4. A corrosion-resistant metal filter comprising a heat-resistant foamed metal having numerous pores that communicate with one another, and a metal fiber having a diameter of from 5 to 40 μm and filling said pore at a packing rate of 5–25%, said metal fiber being selected from the group consisting of alloy compositions A, B and C, wherein composition A comprises Ni: 5–20% by weight, Cr: 10–40% by weight, Al: 1–15% by weight, based on the total weight of the composition, the remainder being Fe and inevitable impurities;

composition B comprises Cr: 10–40% by weight, Al: 1–15% by weight, based on the total weight of the composition, the remainder being Ni and inevitable impurities; and composition C comprises Cr: 10–40% by weight, Al: 1–15% by weight, based on the total weight of the compositions, the remainder being Fe and inevitable impurities.

5. A corrosion-resistant metal filter as claimed in claim 2 wherein said metal fiber is a member selected from the group consisting of a hollow fiber or a fiber having a core made of a material different from a surrounding material.

6. A corrosion-resistant metal filter as claimed in claims 1 or 4 wherein the concentration Al in compositions A, B. and C is higher near a surface of the metal fiber.

7. A corrosion-resistant metal fiber according to claim 5 wherein said metal fiber is a hollow fiber.

* * * * *